United States Patent
Chen et al.

(10) Patent No.: US 7,180,757 B2
(45) Date of Patent: Feb. 20, 2007

(54) SEQUENTIAL SOFT-START CIRCUIT FOR MULTIPLE CIRCUIT CHANNELS

(75) Inventors: Yung-Chih Chen, Pingtung County (TW); Chih-Chia Chen, Taipei (TW)

(73) Assignee: Aimtron Technology Corp., Hsinchu (TW)

( * ) Notice: Subject to any disclaimer, the term of this patent is extended or adjusted under 35 U.S.C. 154(b) by 173 days.

(21) Appl. No.: 10/907,952

(22) Filed: Apr. 22, 2005

(65) Prior Publication Data
US 2006/0239045 A1    Oct. 26, 2006

(51) Int. Cl.
*H02M 1/00* (2006.01)
*H02H 7/10* (2006.01)

(52) U.S. Cl. .................. 363/49; 363/50; 323/901

(58) Field of Classification Search .......... 363/49, 363/50; 323/901, 908
See application file for complete search history.

(56) References Cited

U.S. PATENT DOCUMENTS

| | | | |
|---|---|---|---|
| 4,257,090 A * | 3/1981 | Kroger et al. | ................. 363/65 |
| 5,508,650 A | 4/1996 | Grimm et al. | |
| 6,100,678 A | 8/2000 | Hobrecht | |
| 6,232,755 B1 * | 5/2001 | Zhang | ......................... 323/282 |
| 6,292,378 B1 * | 9/2001 | Brooks et al. | ................ 363/65 |
| 6,377,032 B1 * | 4/2002 | Andruzzi et al. | ........... 323/224 |
| 6,462,520 B1 * | 10/2002 | Mangtani et al. | ........... 323/271 |
| 6,465,993 B1 * | 10/2002 | Clarkin et al. | .............. 323/272 |
| 6,965,219 B2 * | 11/2005 | Brooks et al. | .............. 323/282 |

OTHER PUBLICATIONS

"MAX1748/MAX8726 Triple-Output TFT-LCD DC-DC Converters" Maxim Integrated Products, Oct. 2004,pp. 1-16,120 San Gabriel Drive, Sunnyvale, CA 94086.

* cited by examiner

*Primary Examiner*—Bao Q. Vu
(74) *Attorney, Agent, or Firm*—Winston Hsu

(57) ABSTRACT

A first to an n-th current sources supply a first to an n-th charging currents, respectively. A sequence control circuit allows an x-th charging current of the first to the n-th charging currents to charge a capacitor for generating an x-th soft-start signal. The variable x is an integer and satisfies an inequality of $n \geq x \geq 1$. Before a y-th charging current is allowed to charge the capacitor for generating a y-th soft-start signal, the sequence control circuit stops charging the capacitor by the x-th charging current and discharges the capacitor toward a ground potential. The variable y is an integer different from the variable x and satisfies an inequality of $n \geq y \geq 1$.

10 Claims, 4 Drawing Sheets

SEQUENTIAL SOFT-START CIRCUIT FOR MULTIPLE CIRCUIT CHANNELS

BACKGROUND OF INVENTION

1. Field of the Invention

The present invention relates to a soft-start circuit and, more particularly, to a sequential soft-start circuit for multiple circuit channels.

2. Description of the Prior Art

For a wide range of integrated circuit designs, soft-start circuits are usually provided to supply a soft-start signal for limiting an inrush current upon activation and protecting the integrated circuits from being damaged thereby.

FIG. 1(A) is a circuit diagram showing an integrated circuit chip 10A provided with a conventional soft-start circuit 12. The integrated circuit chip 10A has a main circuit 11 and a soft-start circuit 12. The main circuit 11 executes the very function that the chip 10A is designed for. In FIG. 1(A), an output signal OUT is illustrated to symbolize the function. For example, if the integrated circuit chip 10A is designed for supplying a current to a load at a regulated voltage, then the main circuit 11 may be implemented by a variety of voltage regulators such as switching regulators or charge pumps, which are well known in the art. The soft-start circuit 12 applies a soft-start signal $V_S$ to the main circuit 11 for limiting the inrush current. Normally, the soft-start signal $V_S$ is a gradually increasing voltage signal. As shown in FIG. 1(A), the soft-start circuit 12 has a soft-start current source $I_S$ and a soft-start capacitor $C_S$. The soft-start current source $I_S$ charges the soft-start capacitor $C_S$ such that the potential difference across the soft-start capacitor $C_S$ gradually increases and serves as the soft-start signal $V_S$. Because of its size, the soft-start capacitor $C_S$ is typically installed on the outside of the integrated circuit chip 10A and connected to the soft-start current source $I_S$ through an electrical pin $P_S$ of the chip package.

FIG. 1(B) is a circuit diagram showing a multi-channel integrated circuit chip 10B. The multi-channel integrated circuit chip 10B has n main circuit channels 11-1, 11-2, to 11-$n$, which are independently controllable with respect to each other, wherein the constant n is an integer larger than or equal to 2. In order to protect the circuit from being damaged by the inrush current upon activation, each of the main circuit channels 11-1, 11-2, to 11-$n$ is correspondingly provided with one of soft-start circuits 12-1, 12-2, to 12-$n$ for generating one of soft-start signals $V_{S1}$, $V_{S2}$, to $V_{Sn}$. Since in each of the soft-start circuits 12-1, 12-2, to 12-$n$ one of soft-start capacitors $C_{S1}$, $C_{S2}$, to $C_{Sn}$ is provided to be correspondingly charged by one of soft-start current sources $I_{S1}$, $I_{S2}$, to $I_{Sn}$ for generating one of the soft-start signals $V_{S1}$, $V_{S2}$, to $V_{Sn}$, the multi-channel integrated circuit chip 10B must have a corresponding number of electrical pins $P_{S1}$, $P_{S2}$, to $P_{Sn}$ for providing the necessary connections with the external soft-start capacitors $C_{S1}$, $C_{S2}$, to $C_{Sn}$. As a disadvantageous result, the chip package has to be made larger for accommodating such many electrical pins $P_{S1}$, $P_{S2}$, to $P_{Sn}$. In addition, the total cost is raised due to the large number of the soft-start capacitors $C_{S1}$, $C_{S2}$, to $C_{Sn}$.

SUMMARY OF INVENTION

In view of the above-mentioned problems, an object of the present invention is to provide a soft-start circuit capable of sequentially soft-starting multiple circuit channels through a single soft-start capacitor, thereby achieving an optimization in terms of the chip size and the pin number.

A sequential soft-start circuit according to the present invention applies a first to an n-th soft-start signals to a first to an n-th circuit channels, respectively, wherein the constant n is an integer and satisfies an inequality of $n \geq 2$. The sequential soft-start circuit comprises a first to an n-th current sources, a capacitor, and a sequence control circuit. The first to the n-th current sources supply a first to an n-th charging currents, respectively. The sequence control circuit allows an x-th charging current of the first to the n-th charging currents to charge the capacitor so as to generate an x-th soft-start signal of the first to the n-th soft-start signals. The x-th soft-start signal is representative of a potential difference across the capacitor. The variable x is an integer and satisfies an inequality of $n \geq x \geq 1$. Before the sequence control circuit allows a y-th charging current of the first to the n-th charging currents to charge the capacitor so as to generate a y-th soft-start signal of the first to the n-th soft-start signals, the sequence control circuit stops charging the capacitor by the x-th charging current and discharges the capacitor toward a ground potential. The variable y is an integer different from the variable x and satisfies an inequality of $n \geq y \geq 1$.

BRIEF DESCRIPTION OF DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 1A:
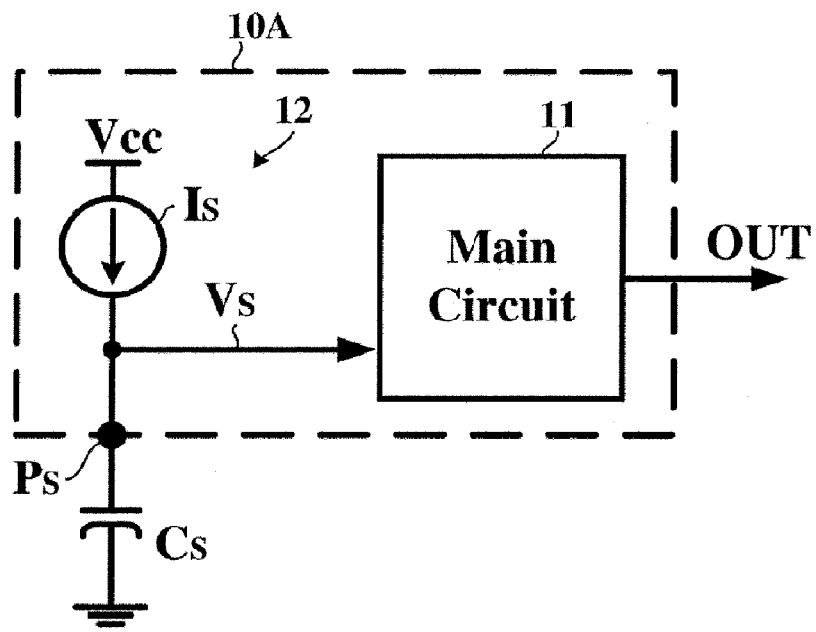
FIG. 1(A) is a circuit diagram showing a conventional single channel integrated circuit chip with a soft-start function.
Figure 1B:
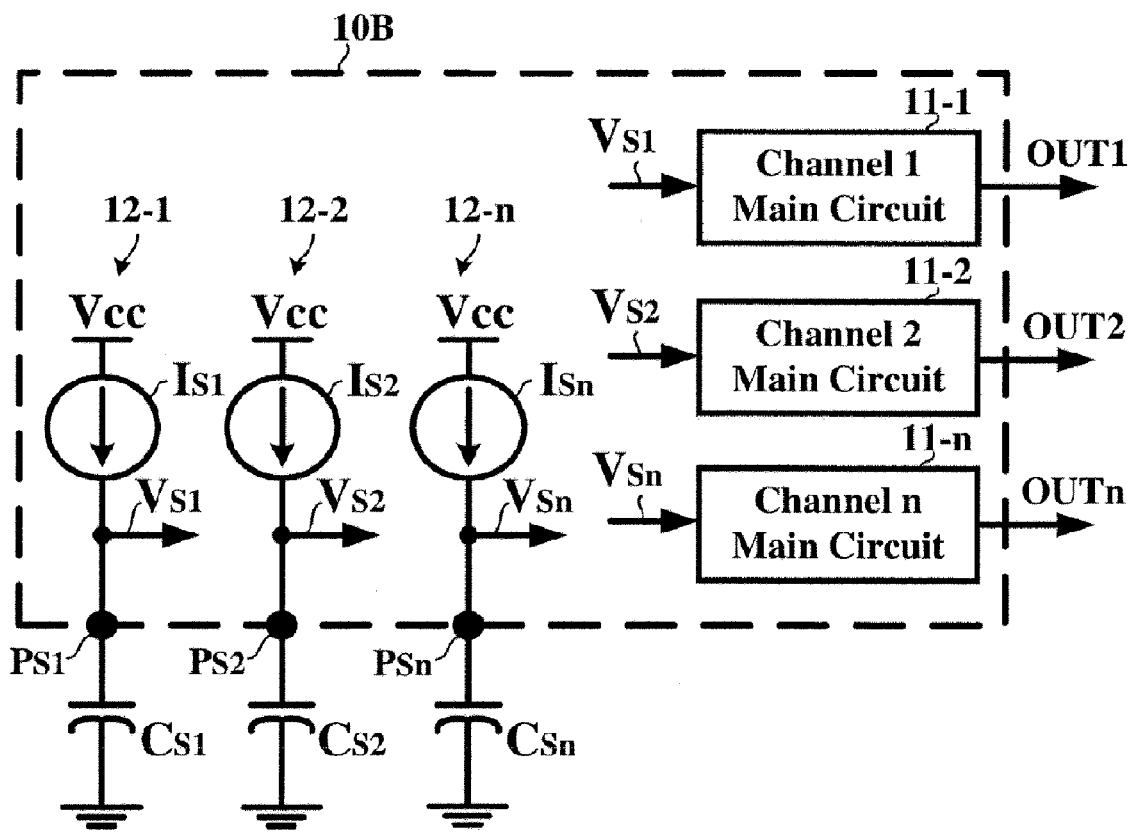
FIG. 1(B) is a circuit diagram showing a conventional multi-channel integrated circuit chip with a soft-start function.
Figure 2:
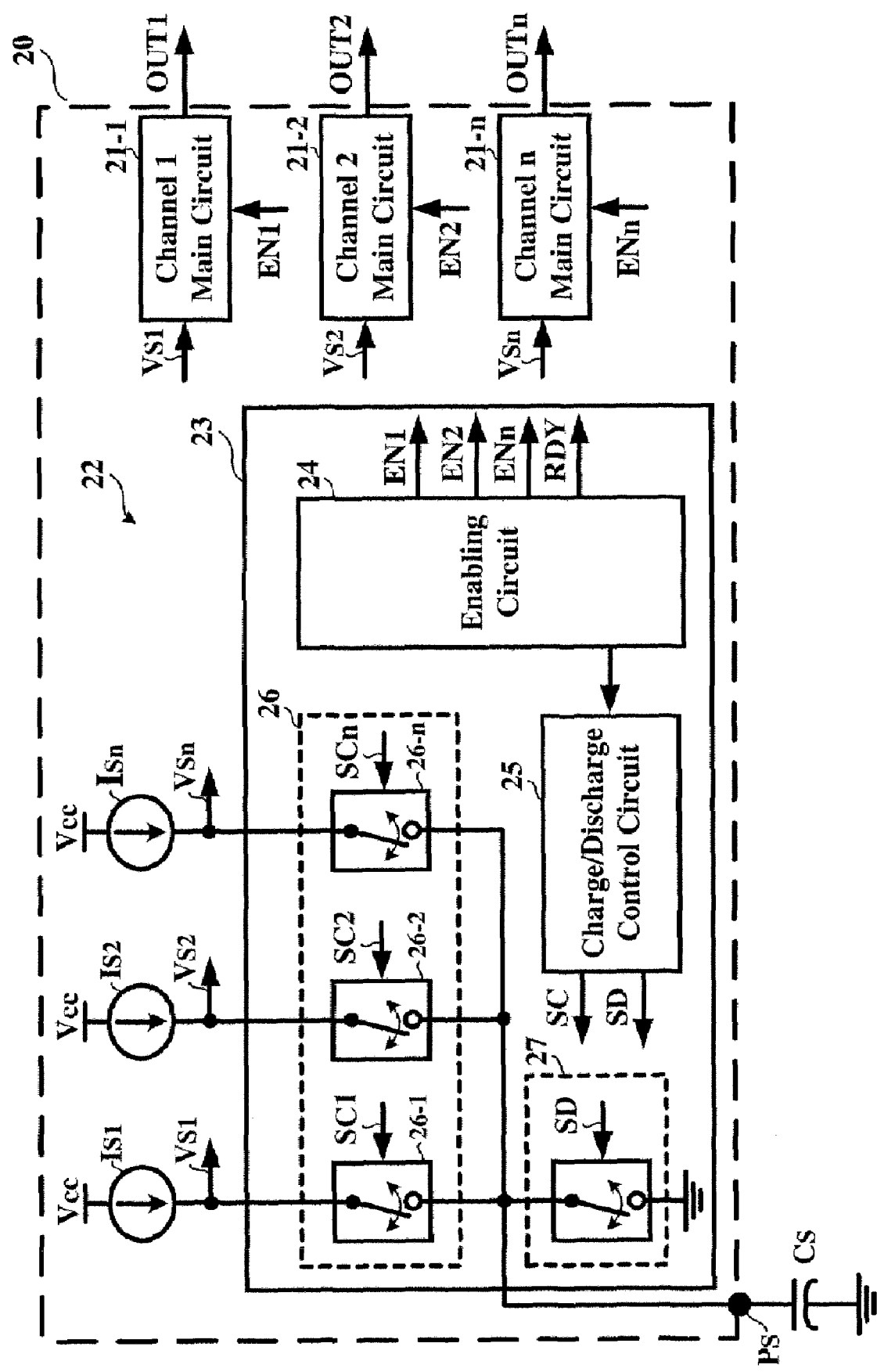
FIG. 2 is a circuit diagram showing a sequential soft-start circuit for multiple circuit channels according to the present invention.

FIG. 2 is a circuit diagram showing a sequential soft-start circuit 22 for multiple circuit channels according to the present invention. As shown, a multi-channel integrated circuit chip 20 has n main circuit channels 21-1, 21-2, to 21-$n$, which are independently controllable with respect to each other, wherein the constant n is an integer larger than or equal to 2. In order to protect the circuitry from being damaged by the inrush current upon activation, the sequential soft-start circuit 22 according to the present invention generates, one by one following a predetermined sequence, a set of soft-start signals $V_{S1}$, $V_{S2}$, to $V_{Sn}$, and then applies them to the main circuit channels 21-1, 21-2, to 21-$n$, respectively. The sequential soft-start circuit 22 is constructed by n soft-start current sources $I_{S1}$, $I_{S2}$, to $I_{Sn}$, a sequence control circuit 23, and a soft-start capacitor $C_S$. On one hand, the soft-start current sources $I_{S1}$, $I_{S2}$, to $I_{Sn}$ are all connected to the sequence control circuit 23; one the other hand, the soft-start capacitor $C_S$ is connected to the sequence control circuit 23 through an electrical pin $P_S$. Following the predetermined sequence, the sequence control circuit 23 allows the soft-start current sources $I_{S1}$, $I_{S2}$, to $I_{Sn}$ to charge the soft-start capacitor $C_S$ and also controls the discharge of the soft-start capacitor $C_S$. Therefore, a single soft-start capacitor $C_S$ and a single electrical pin $P_S$ are enough for generating all of the necessary soft-start signals $V_{S1}$, $V_{S2}$, to $V_{Sn}$.

The sequence control circuit 23 has an enabling circuit 24, a charge/discharge control circuit 25, a charge switching circuit 26, and a discharge switching circuit 27. After the multi-channel integrated circuit chip 20 is connected to an appropriate external power supply and obtains the power necessary for operation, the enabling circuit 24 immediately generates and supplies a first enable signal EN1 to the first main circuit channel 21-1.

Following that the enabling circuit 24 generates the enable signals EN1, EN2, to ENn in accordance with the predetermined sequence, the charge/discharge control circuit 25 correspondingly generates a charge signal SC and a discharge signal SD for respectively controlling the charge switching circuit 26 and the discharge switching circuit 27. The charge switching circuit 26 has n independently controllable switching units 26-1, 26-2, to 26-n, correspondingly arranged between the soft-start current sources $I_{S1}$, $I_{S2}$, to $I_{Sn}$ and the soft-start capacitor $C_S$, for controlling the charge of the soft-start capacitor $C_S$. The discharge switching circuit 27 is arranged between the soft-start capacitor $C_S$ and a ground potential for controlling the discharge of the soft-start capacitor $C_S$.

After the first main circuit channel 21-1 is enabled to start operating, the first switching unit 26-1 of the charge switching circuit 26 allows the first soft-start current source $I_{S1}$ to charge the soft-start capacitor $C_S$ such that the potential difference across the soft-start capacitor $C_S$ gradually increases and serves as the first soft-start signal $V_{S1}$. The first soft-start signal $V_{S1}$ is applied to the first main circuit channel 21-1 for limiting the inrush current. As soon as the first main circuit channel 21-1 reaches a stable operation state, the first switching unit 26-1 of the charge switching circuit 26 is formed OPEN-circuited for maintaining the first soft-start signal $V_{S1}$ at a high level, which is no longer associated with the potential difference across the soft-start capacitor $C_S$. At this moment, the discharge switching circuit 27 is formed SHORT-circuited such that the soft-start capacitor $C_S$ is discharged toward the ground potential. As a result, the potential difference across the soft-start capacitor $C_S$ returns to zero so as to become ready for the next soft-start operation to be applied to the second main circuit channel 21-2.

After the discharge of the soft-start capacitor $C_S$ is finished, the enabling circuit 24 applies a second enable signal EN2 to the second main circuit channel 21-2. Under the control of the charge/discharge control circuit 25, the second switching unit 26-2 of the charge switching circuit 26 allows the second soft-start current sources $I_{S2}$ to charge the soft-start capacitor $C_S$ such that the potential difference across the soft-start capacitor $C_S$ gradually increases and serves as the second soft-start signal $V_{S2}$. The second soft-start signal $V_{S2}$ is applied to the second main circuit channel 21-2 for limiting the inrush current. As soon as the second main circuit channel 21-2 reaches a stable operation state, the second switching unit 26-2 of the charge switching circuit 26 is formed OPEN-circuited for maintaining the second soft-start signal $V_{S2}$ at a high level, which is no longer associated with the potential difference across the soft-start capacitor $C_S$. At this moment, the discharge switching circuit 27 is formed SHORT-circuited such that the soft-start capacitor $C_S$ is discharged toward the ground potential. As a result, the potential difference across the soft-start capacitor $C_S$ returns to zero so as to become ready for the next soft-start operation to be applied to the x-th main circuit channel 21-x, wherein the variable x is an integer and satisfies an inequality of $n \geq x \geq 1$. Repeat the procedure described above until all of the main circuit channels 21-1, 21-2, to 21-n are sequentially soft-started and reach the sable operation states.

Figure 3:
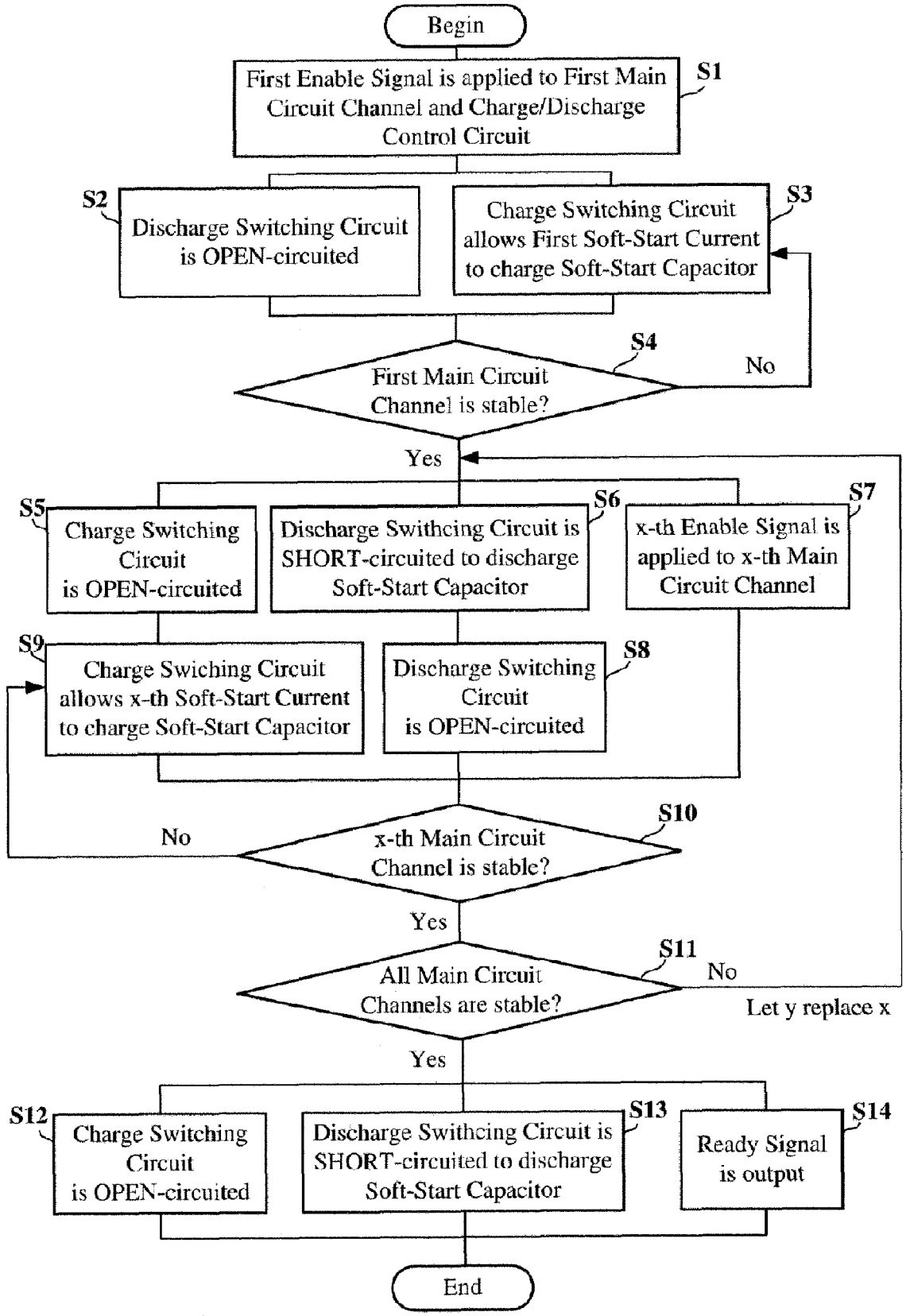
FIG. 3 is a flow chart showing a sequential soft-start method for multiple circuit channels according to the present invention.

FIG. 3 is a flow chart showing a sequential soft-start method for multiple circuit channels according to the present invention. In a step S1, the first enable signal EN1 is applied to the first main circuit channel 21-1 and the charge/discharge control circuit 25 for beginning the sequential soft-start method according to the present invention. In a step S2, the discharge switching circuit 27 is formed OPEN-circuited. In a step S3, the charge switching circuit 26 allows the first soft-start current source $I_{S1}$ to charge the soft-start capacitor $C_S$ for generating the first soft-start signal $V_{S1}$ to be applied to the first main circuit channel 21-1. In a step S4, the enabling circuit 24 determines whether the first main circuit channel 21-1 reaches a stable operation state or not. If no, then the step S3 is repeated. If yes, then steps S5, S6, and S7 are executed. In the step S5, the charge switching circuit 26 is formed OPEN-circuited so as to stop charging the soft-start capacitor $C_S$ and maintain the first soft-start signal $V_{S1}$ high. In the step S6, the discharge switching circuit 27 is formed SHORT-circuited such that the soft-start capacitor $C_S$ is discharged toward the ground potential. In the step S7, the x-th enable signal Enx is applied to the x-th main circuit channel 21-x, wherein the variable x is an integer and satisfies an inequality of $n \geq x \geq 1$.

In a step S8, the discharge switching circuit 27 is formed OPEN-circuited so as to stop discharging the soft-start capacitor $C_S$. In a step S9, the charge switching circuit 26 allows the x-th soft-start current source $I_{Sx}$ to charge the soft-start capacitor $C_S$ for generating the x-th soft-start signal $V_{Sx}$ to be applied to the x-th main circuit channel 21-x. In a step 10, the enabling circuit 24 determines whether the x-th main circuit channel 21-x reaches a stable operation state or not. If no, then the step S9 is repeated. If yes, then a step S11 is executed. If not all of the main circuit channels 21-1, 21-2, to 21-n reach the stable operation states, then the steps S5 to S11 are repeated. That is, in accordance with the predetermined sequence, a y-th main circuit channel 21-y is enabled wherein the variable y is an integer different from the variable x and satisfies an inequality of $n \geq y \geq 1$. If all of the main circuit channels 21-1, 21-2, to 21-n reach the stable operation states, then the charge switching circuit 26 is formed OPEN-circuited so as to stop charging the soft-start capacitor $C_S$ in a step S12, the discharge switching circuit 27 is formed SHORT-circuited such that the soft-start capacitor $C_S$ is discharged toward the ground potential in a step 13, and the enabling circuit 24 outputs a ready signal RDY for indicating that all of the main circuit channels 21-1, 21-2, to 21-n have already reached the stable operation states in a step S14. Therefore, the sequential soft-start method for the multiple circuit channels according to the present invention is effectively performed.

Figure 4:
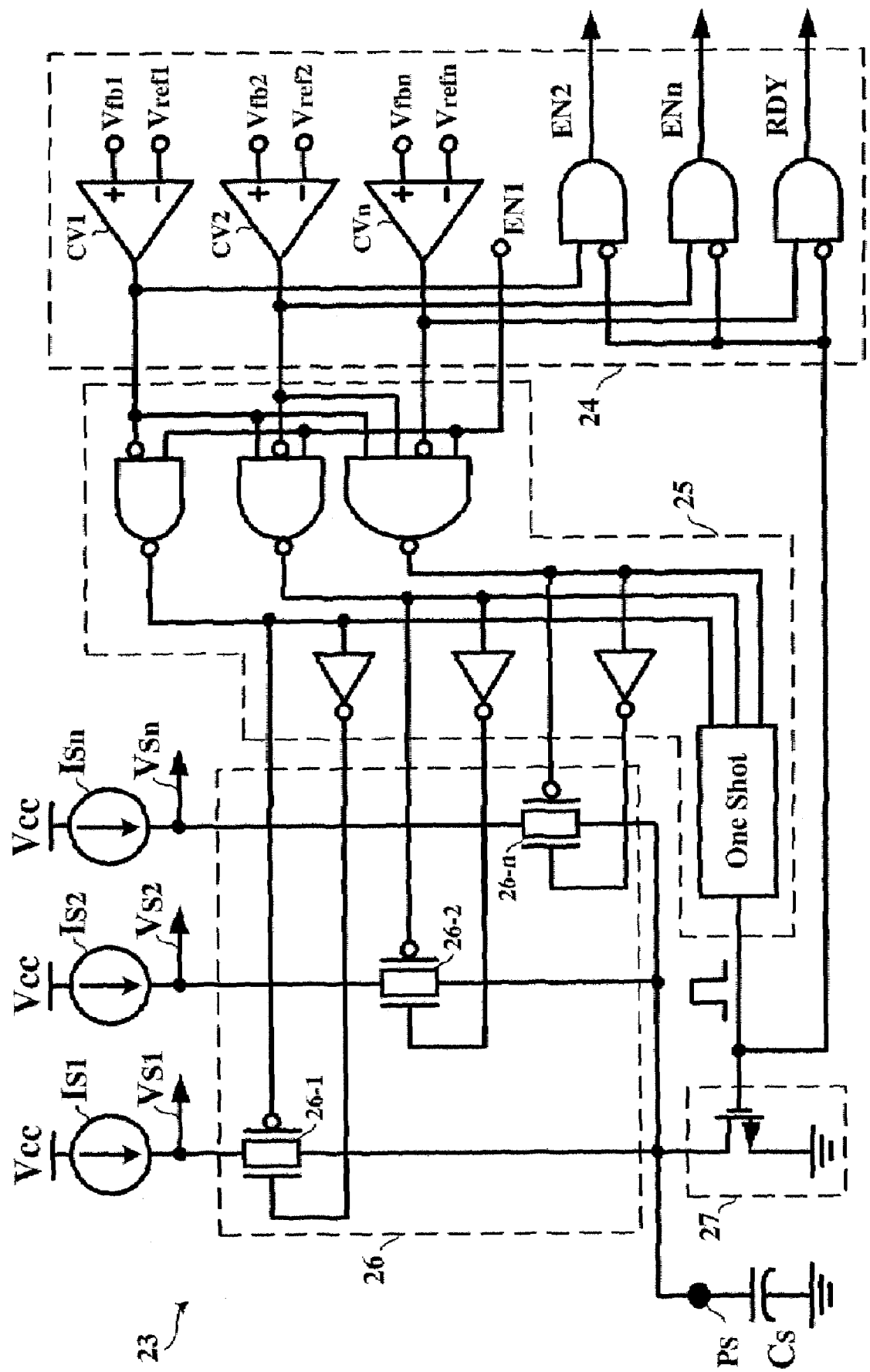
FIG. 4 is a circuit diagram showing one example of a sequence control circuit according to the present invention.

FIG. 4 is a circuit diagram showing one example of the sequence control circuit 23 according to the present invention. Based on n feedback signals $V_{fb1}$, $V_{fb2}$, to $V_{fbn}$, the enabling circuit 24 is implemented to determine the operation states of the main circuit channels 21-1, 21-2, to 21-n and then command the charge/discharge control circuit 25 in response to the determination. Since employed to indicate the operation states of the main circuit channels 21-1, 21-2, to 21-n, the feedback signals $V_{fb1}$, $V_{fb2}$, to $V_{fbn}$ may be converted from the output signals OUT1, OUT2, to OUTn, respectively. For example, in a case that the multi-channel integrated circuit chip 20 is of a multi-channel voltage regulator and each of the output signals OUT1, OUT2, to OUTn represents one of multiple regulated voltages, the feedback signals $V_{fb1}$, $V_{fb2}$, to $V_{fbn}$ may be generated through the use of resistive voltage dividers and be respectively proportional to the output signals OUT1, OUT2, to OUTn.

More specifically, the enabling circuit 24 is implemented by n voltage comparators CV1, CV2, to CVn, each of which determines whether the corresponding main circuit channel reaches the stable operation state or not. For example, the first voltage comparator CV1 has a non-inverting input terminal for receiving the first feedback signal $V_{fb1}$ proportional to the first output signal OUT1, and an inverting input terminal for receiving a predetermined first reference voltage $V_{ref1}$. As soon as the first main circuit channel 21-1 reaches the stable operation state, the first feedback voltage $V_{fb1}$ goes beyond the first reference voltage $V_{ref1}$ to trigger the first voltage comparator CV1.

The charge/discharge control circuit 25 may be implemented by a combinational logic circuit for controlling the charge switching circuit 26 and the discharge switching circuit 27 in response to the determination of the enabling circuit 24. In the charge switching circuit 26, each of the n independently controllable switching units 26-1, 26-2, to 26-n is implemented by a transmission gate for being correspondingly connected between one of the soft-start current sources $I_{S1}$, $I_{S2}$, to $I_{Sn}$ and the soft-start capacitor $C_S$. The discharge switching circuit 27 may be implemented by an NMOS transistor.

In the embodiment shown in FIG. 4, although the enabling circuit 24 is triggered by determining the operation states of the main circuit channels to generate the enable signals, the present invention is not limited to this and may be applicable to a case that the enabling circuit 24 generates the necessary enable signals one by one at a set of time instants controlled by a timing circuit or a counter. In this case, the timing circuit of the enabling circuit 24 may have a programmable function such that users or manufacturers can more flexibly modify the generation sequence of the enable signals and the time interval between every two enable signals.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A sequential soft-start circuit for applying a first to an n-th soft-start signals to a first to an n-th circuit channels, respectively, wherein the constant n is an integer and satisfies an inequality of $n \geq 2$, the circuit comprising:
    a first to an n-th current sources for supplying a first to an n-th charging currents;
    a capacitor; and
    a sequence control circuit for allowing an x-th charging current of the first to the n-th charging currents to charge the capacitor so as to generate an x-th soft-start signal of the first to the n-th soft-start signals, the x-th soft-start signal being representative of a potential difference across the capacitor, wherein the variable x is an integer and satisfies an inequality of $n \geq x \geq 1$, characterized in that:
    before the sequence control circuit allows a y-th charging current of the first to the n-th charging currents to charge the capacitor so as to generate a y-th soft-start signal of the first to the n-th soft-start signals, the sequence control circuit stops charging the capacitor by the x-th charging current and discharges the capacitor toward a ground potential, wherein the variable y is an integer different from the variable x and satisfies an inequality of $n \geq y \geq 1$.

2. The circuit according to claim 1, wherein:
    the sequence control circuit comprises:
        a charge switching circuit connected between the first to the n-th current sources and the capacitor;
        a discharge switching circuit connected between the capacitor and the ground potential;
        an enabling circuit for enabling the first to the n-th circuit channels one by one in accordance with a predetermined sequence; and
        a charge/discharge control circuit for discharging the capacitor through the discharge switching circuit toward the ground potential before the enabling circuit enables one of the first to the n-th circuit channels, and allowing one of the first to the n-th charging currents to charge the capacitor through the charge switching circuit after the enabling circuit enables the one of the first to the n-th circuit channels.

3. The circuit according to claim 2, wherein:
    the charge switching circuit has a first to an n-th switching units, which are independently controllable with respect to each other and correspondingly connected to the first to the n-th current sources.

4. The circuit according to claim 2, wherein:
    the enabling circuit enables a not-yet-enabled circuit channel of the first to the n-th circuit channels after a currently-enabled circuit channel of the first to the n-th circuit channels reaches a stable operation state.

5. The circuit according to claim 2, wherein:
    the enabling circuit has a first to an n-th voltage comparators, each of which determines whether a corresponding circuit channel of the first to the n-th circuit channels reaches a stable operation state or not.

6. A sequential soft-start method for applying a first to an n-th soft-start signals to a first to an n-th circuit channels, respectively, wherein the constant n is an integer and satisfies an inequality of $n \geq 2$, the method comprising:
    providing a first to an n-th current sources for supplying a first to an n-th charging currents;
    providing a capacitor;
    allowing an x-th charging current of the first to the n-th charging currents to charge the capacitor so as to generate an x-th soft-start signal of the first to the n-th soft-start signals, the x-th soft-start signal being representative of a potential difference across the capacitor, wherein the variable x is an integer and satisfies an inequality of $n \geq x \geq 1$;
    stopping charging the capacitor by the x-th charging current;
    discharging the capacitor toward a ground potential; and
    allowing a y-th charging current of the first to the n-th charging currents to charge the capacitor so as to generate a y-th soft-start signal of the first to the n-th soft-start signals, wherein the variable y is an integer different from the variable x and satisfies an inequality of $n \geq y \geq 1$.

7. The method according to claim 6, further comprising:
enabling the first to the n-th circuit channels one by one in accordance with a predetermined sequence such that the capacitor is discharged through a discharge switching circuit toward the ground potential before one of the first to the n-th circuit channels is enabled, and one of the first to the n-th charging currents is allowed to charge the capacitor through a charge switching circuit after the one of the first to the n-th circuit channels is enabled.

8. The method according to claim 7, wherein:
the charge switching circuit has a first to an n-th switching units, which are independently controllable with respect to each other and correspondingly connected to the first to the n-th current sources.

9. The method according to claim 7, wherein:
a not-yet-enabled circuit channel of the first to the n-th circuit channels is enabled after a currently-enabled circuit channel of the first to the n-th circuit channels reaches a stable operation state.

10. The method according to claim 7, further comprising:
providing a first to an n-th voltage comparators, each of which determines whether a corresponding circuit channel of the first to the n-th circuit channels reaches a stable operation state or not.

* * * * *